United States Patent [19]

Brugalieres et al.

[11] Patent Number: 5,273,252
[45] Date of Patent: Dec. 28, 1993

[54] CLAMP FOR CRIMPING A MAIN, SUCH AS A GAS PIPE

[75] Inventors: Louis-Bernard Brugalieres; Yvan F. P. Bernelle, both of Marseille, France

[73] Assignee: Gaz de France, Paris, France

[21] Appl. No.: 942,210

[22] Filed: Sep. 9, 1992

[30] Foreign Application Priority Data

Sep. 10, 1991 [FR] France .................. 91 11141

[51] Int. Cl.[5] .............................................. F16K 7/02
[52] U.S. Cl. .......................................... 251/9; 294/115
[58] Field of Search ............... 251/9; 244/115; 269/32

[56] References Cited

U.S. PATENT DOCUMENTS

| 1,701,411 | 2/1929 | Kellam | 251/9 |
| 2,212,801 | 8/1940 | Torbert . | |
| 2,825,525 | 3/1958 | Kellam | 251/9 |
| 3,094,349 | 6/1963 | Schwalm | 294/115 |
| 3,260,098 | 7/1966 | Gill . | |
| 4,304,433 | 12/1981 | Langowski | 294/115 X |
| 5,071,102 | 12/1991 | Gray | 251/9 X |

FOREIGN PATENT DOCUMENTS

| 1384116 | 11/1964 | France | 251/9 |
| 1385229 | 11/1964 | France | 251/9 |
| 2424467 | 4/1978 | France . | |

Primary Examiner—John C. Fox

[57] ABSTRACT

A clamp comprising first and second pivotally connected jaws, each having an inner surface facing the other. According to the invention, in the closed position of the tool, the inner surfaces of the jaws, define between them, a crimping profile in the shape of an elongate "V"-shaped gap.

10 Claims, 2 Drawing Sheets

CLAMP FOR CRIMPING A MAIN, SUCH AS A GAS PIPE

FIELD OF THE INVENTION

The invention relates to a tool for locally crushing a main, such as a buried plastic pipe, in which a fluid, such as pressurized gas or a liquid, may flow.

BACKGROUND OF THE INVENTION

Various tools whose function is to interrupt, at least partially, the flow of a fluid in a pipe are known today.

On this subject, the tools described in publications U.S. Pat. No. 3,260,098 and FR-A-2,424,467 can in particular be mentioned.

The two "pipe-crusher" tools described here comprise two facing jaws which can move translationally with respect to each another (in order to come together or move apart), under the action of associated control means.

These types of tools have various drawbacks:

firstly, they are bulky, necessitating a relatively large space and a long time for implementation, next, they require, for their installation around the main to be crushed, wide and deep ditches to be dug, moreover, especially due to their bulk, it is not always easy to check visually whether they are acting correctly on the main, the zone of their jaws being difficult to see.

BRIEF DESCRIPTION OF THE INVENTION

The object of the invention is, in particular, to provide a solution to these problems, by providing a compact "pipe-crusher" tool, rapid to install and to withdraw and whose efficiency it will be easy to check.

It is to this end that the invention thus provides a tool for locally crushing a main, such as a buried plastic pipe, in which a fluid, such as pressurized gas or a liquid, may flow, comprising:

movable jaws for clamping the said main, and means for controlling the relative movement of the said jaws, from an open position towards a closed position for clamping the said main, this tool being characterized in particular in that its jaws are articulated to each other in rotation in order to form a clamp.

Thus, when for example a gas main is pierced, a rapid intervention team equipped with such shut-off clamps will be able to intervene simultaneously with the emergency services (fire brigade, police, etc), under good safety conditions and with very good reliability regarding the result to be obtained (interruption of the leak).

In a preferred construction characteristic, the jaws of the clamp will be non-joining, at least over their length by which they must come into contact with the main, so as to maintain between them, even in the completely closed position of the clamp, an intermediate space, thus avoiding overly crushing the main as far as to damage it.

According to another characteristic, in the closed or substantially closed position, the inner surfaces of the jaws of the clamp will define between them a clamping profile advantageously in the shape of an elongate and curved slot, preferably having a constant thickness of the order of twice the wall thickness of the main.

With such a shape, it will especially be possible to prevent the clamp or the part to be clamped from slipping or escaping during intervention, the width of the slot maintained between the jaws avoiding damaging the pipe.

In a preferred embodiment, the inner surfaces of these jaws may have the general shape of a V, which shape appears completely favorable to a positioning and to an action of the clamp which is both rapid and efficient, even in cramped locations.

The means for maneuvering or controlling the jaws, which will preferably be removable, may consist of pressurized supply members, such as a hydraulic supply, or of mechanical force-application members, such as a non-return ratchet system.

Since the clamp of the invention may be left standing for some time, it will preferably be further equipped with means for locking its jaws in the clamping position, after removing the removable maneuvering members.

In that which follows, the invention will now be described in more detail, in particular making reference to the accompanying drawings given solely by way of non-limiting examples and in which:

DETAILED DESCRIPTION OF THE INVENTION

Figure 1:
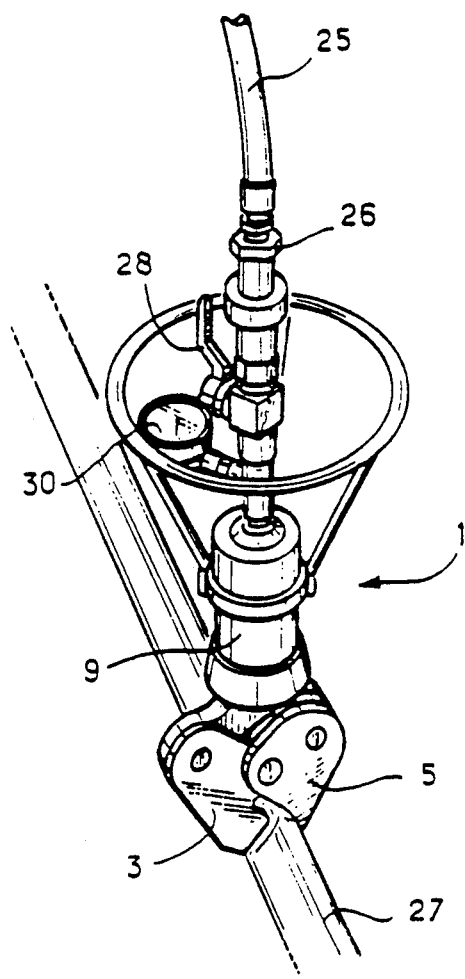
FIG. 1 is a diagrammatic external assembly illustration of a first embodiment of the invention showing the clamp in an actual condition of intervention on a gas main.
Figure 2:
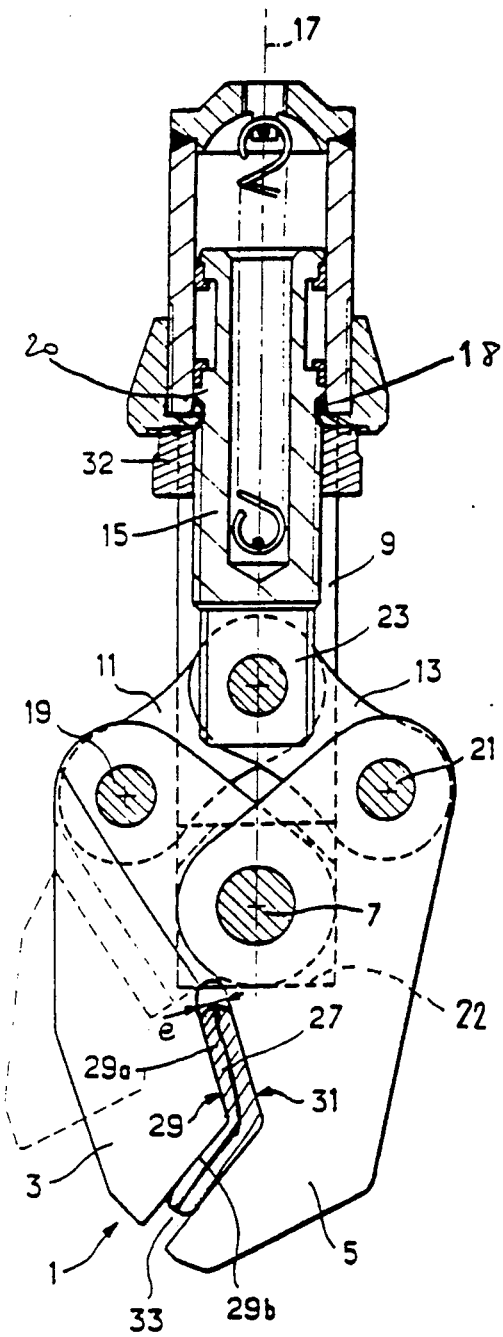
FIG. 2 is a partially sectioned detailed view of the clamp of FIG. 1.

Firstly, FIGS. 1 and 2 therefore represent a clamp 1 with jaws or clamping jaws 3 and 5.

These jaws, here two in number, are articulated in rotation in order to pivot about a common fixed pin 7 carried by the body 9 of the clamp.

In order to provide the closing and opening movements of the jaws, the latter are each connected, axially and towards the rear, via two links 11, 13 to the end of a piston or sliding stem 15 moving translationally inside the hollow body 9 of the clamp, which body is in the general shape of a cylinder of axis 17, forming a guiding cylinder for the piston 15. A stop 18, with variable axial positioning, has been provided in order to limit the travel of the piston in the clamping direction of the jaws in interaction with a local flange 20 of this piston in order, in particular, to be able to maintain a space between the said jaws, even in the maximum closed position, this being in order to avoid damaging the pipes, as will be seen hereafter.

In FIG. 2, the three movable attachment points for articulation of the jaws have been designated by 19, 21 and 23, with respectively 19 and 21 being the pivoting and attachment zones of the links to the jaws, and 23 being the attachment zone of these same links to the piston.

The movement of the piston 15 is provided by means of a pressure supply, such as hydraulic supply.

Thus, as can be seen in FIG. 1, the piston may be connected up to a small hydraulic pump (not shown) via a hose 25 fitted with a disconnectable connection endpiece 26 with a tap 28 and manometer 30 for controlling the pressure.

In FIG. 1, it will be noted that the clamp is represented in action, with its jaws laterally pinching a main 27, such as in this case a pressurized gas main, in order to crush it.

It will also be noted that its structure allows the clamp to come and take the pipe from above, without a lower pinching shoe as in existing "pipe-crusher" tools, thereby avoiding having to clear the access to the mains entirely and deeply.

As noted previously, one characteristic of the invention relates to the shape of the jaws and more particularly to their inner pinching or clamping surfaces 29, 31 accordingly provided so as preferably to be non-joining, even in the maximum closed position of the jaws.

In FIG. 2, in which the clamp has been illustrated with its jaws in the clamping position, it is thus observed that the surfaces 29 and 31 define between them a clamping profile in the shape of an elongate and curved slot 33 extending over the entire length of these surfaces.

More precisely, it can be observed that in this position the inner surface 29 of the first jaw 3 is generally protrudes, while the facing surface 31 of the second jaw 5 recedes, the two surfaces having substantially complementary shapes. In this manner, in the closed or substantially closed position of the clamp, these facing surfaces will at least partially engage each other, as illustrated in FIG. 2.

In order to prevent the clamp cutting the main (reference 27 in FIG. 2), thus risking further leaks, the thickness e of the intermediate space 33 has been chosen to be equal to approximately twice the thickness of the wall of the pinched main.

Thus, crushing with shut-off is provided, without the possibility of cutting the mains.

In order to maintain the jaws in the desired position (normally the clamping position), a knurled nut or a lock nut 32 has been provided which can be screwed onto the body of the clamp in order to lock the position of the piston, the knurled nut continuing to act, even after the hydraulic supply has been removed.

It will also be noted that, in order to limit the risks of tearing or cutting during intervention, the inner surfaces of the jaws will be non-aggressive and will advantageously have rounded corners, thus being free of roughnesses and other sharp, more of less cutting edges, considering the pressures exerted which may reach 250 bar.

In FIGS. 1 and 2, but also in FIGS. 3 and 4 which will briefly be described hereinafter, the inner surfaces 29 and 31 each have the general shape of a rather flared V with, for example, a V opening of the order of 130° to 150°. This shape promotes the crushing of the pipes without leak. Each jaw 35, 37 will have a rectilinear or plane outward surface such as in FIG. 2. One of these jaws 35 will have concavity 34 made at an inner region, in this case the most distant from the free end of the jaws (see FIG. 4), thus forming a sort of deformation "pocket" for the pipe.

Figure 3:
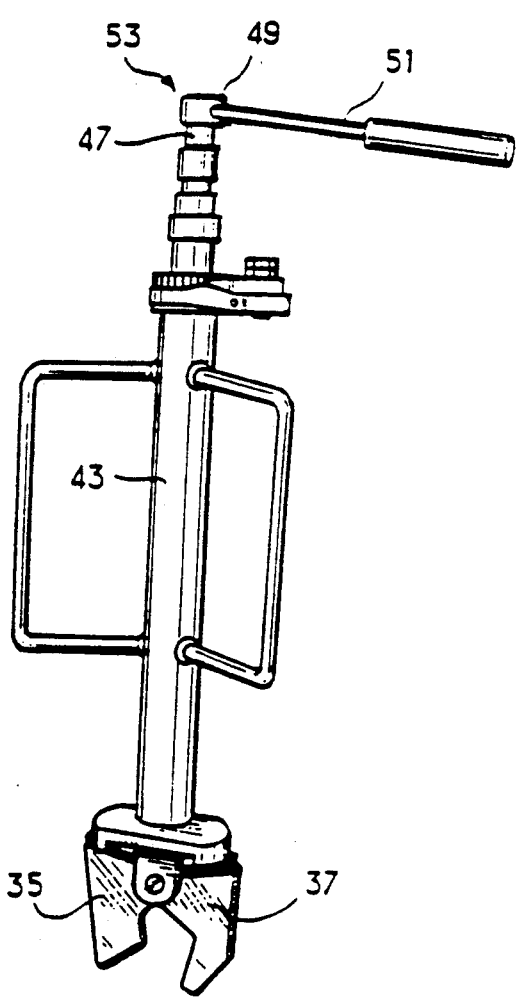
FIG. 3 shows a diagrammatic illustration in external view of an embodiment variant of the clamp of the invention.
Figure 4:
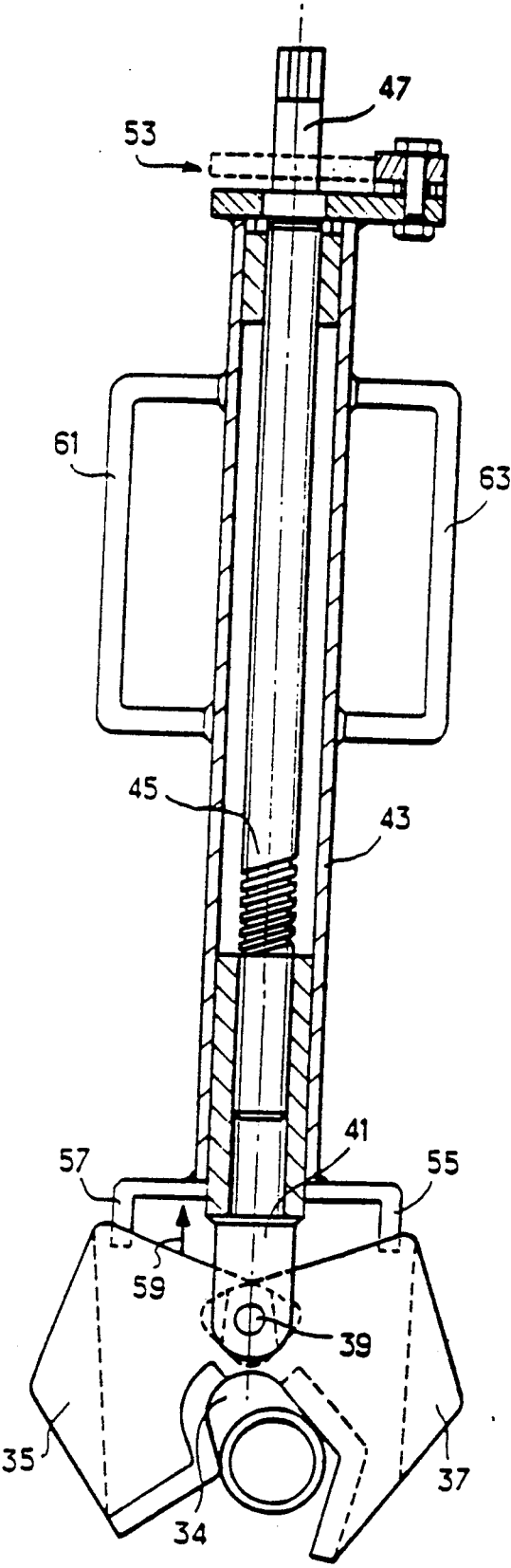
FIG. 4 is a partially sectioned, more detailed view of the clamp illustrated in FIG. 3.

FIGS. 3 and 4, then, illustrate an embodiment variant of the clamp.

This variant can be differentiated from the previous one insofar as here the jaws 35 or 37 are articulated in rotation about a single common pin 39 connected to a sliding end-piece 41 mounted so as to move translationally inside the hollow cylindrical body 43 of the clamp, this being under the control of a screw 45 housed inside the body 43.

At its end opposite the jaws, the screw 45 interacts with an end-piece 47 projecting axially from the body 43. This end-piece is adapted for receiving the socket 49 of a lever 51, so as to form a removable maneuvering system with a single-directional non-return ratchet 53 adapted for suitably clamping the two jaws of the clamp, which in order to act efficiently can each bear against one end of a flat 55, 57 fixed to the body 43 on the same side as its end close to the said jaws, this bearing operating continuously during clamping as the end-piece 41 moves axially in the direction of the arrow 59.

In the figures, it will be noted that provision has been made for facilitating the maneuvering of the clamp by means of two handles 61, 63 projecting laterally and outwardly from the body 43.

Whichever of the illustrated embodiments is being considered, the clamp of the invention is simple and rapid to use.

The two variants in question having been globally expounded on the same principle, only the operating method of the first variant of FIGS. 1 and 2 will be briefly described hereinafter, this being for the case of an intervention on a main, such as the main 27.

After having connected up the hose 25 which is connected to the hydraulic pump, upstream of the shut-off valve 28, the complete opening of the jaws and the unlocking of the safety device 32 (as well as the adjustment of the knurled stop nut 18) will be checked.

In order to intervene on the main, it is then sufficient, from the top of the ditch, to position the clamp vertically astride the main 27, and to maintain it until the first sign of clamping. It will be noted that, due to the pressure, the tool practically immediately takes hold all by itself.

The pump can then be actuated. When the pressure in the piston 15 approaches a previously determined pressure, such as, for example, 250 bar for the polyethylene mains tested, shut-off is considered as being obtained (the end-of-travel safety stop of the piston, if it has been correctly adjusted, serving to prevent the jaws from totally closing). The fluid should then no longer flow in the mains. It will be noted that, in this position of complete shut-off of the pipe, the two "V"s 29, 31 of the jaws extend substantially parallel to each another.

The lock nut 32 is then screwed and then the hose 25 is disconnected from the pump. The intervention is thus finished.

Of course, other embodiment variants calling upon the same actuating principle, with a shape of the jaws which is comparable or equivalent in their action could have been conceived. For example, the jaws could have been shaped so that they have two facing extensions at their free end, forming curved noses of thickness adapted for constituting a crushing stop and thus maintaining the minimum spacing e between the jaws. But in this case, it would be necessary, during the installation of the clamp, to ensure that the main cannot become wedged between the noses, which would then have to be positioned quite distinctly beyond the lower perimeter edge of the main, perhaps necessitating a slightly deeper ditch.

Another solution consists in adapting, on one side, the distance between the two articulation points 19, 21 (FIG. 2) and, on the other side, the location of the end wall 22 of body 9, in order to reserve between the jaws the intermediate space 33, when the inflated portion 23 of the links 11, 13 comes in abutment against said end wall 22.

An end stop for the screw 45 would produce the same effect.

We claim:

1. A crimping tool for crimping a pipe in which fluid flows, the tool comprising:

two movable jaws rotatable about a common pivot point between an open and a closed position, said jaws each having a V-shaped surface for crimping said pipe, one of said jaw surfaces being convex and the other being concave;

means connected to said jaws for controlling the joint movement thereof around their common pivot point; and, stopping means for selectively maintaining a generally uniform gap between said convex and concave surfaces when the jaws are closed, resulting in spaced mating relation of the surfaces.

2. A tool according to claim 1 wherein said gap has a dimension corresponding to substantially twice a wall thickness of the pipe for tightly crimping said pipe between closed jaws.

3. A tool according to claim 1, wherein each V-shaped surface has two sections, one of which includes a curved recess defining a deformation pocket for the pipe during crimping.

4. A tool according to claim 1, wherein said means for controlling the relative movement of the jaws comprise a piston moving in a cylinder in response to pressure from a disconnectable pressure supply;

said piston pivotally connected to a first end of two links;

opposite ends of said links respectively connected to the jaws for rotating them between their open and closed positions, about their common pivot point.

5. A tool according to claim 4, wherein said stopping means is connected to said controlling means for selectively blocking movement of said piston, so that the smallest space assumable by said jaws is the gap present between the jaws in the closed position of the tool.

6. A tool according to claim 1, further comprising locking means for maintaining said jaws in the closed crimping position after the pressure is released.

7. A tool according to claim 1 wherein the surfaces of the jaws have rounded corners and are free of harmful zones capable of damaging the wall of the pipe.

8. A crimping tool for crimping a pipe in which fluid flows, the tool comprising:

two movable jaws rotatable about a common pivot point, between an open and a closed position, said jaws each having an angled surface for crimping said pipe, one of said surfaces being angularly convex and the other being angularly concave;

means controlling the relative movement of the jaws, including a piston moving in a cylinder in response to pressure from a disconnectable pressure supply, said piston pivotally connected to a first end of two links, opposite ends of said links respectively connected to the jaws for rotating them between their open and closed positions, about their common pivot point; and, stopping means for selectively maintaining a generally uniform gap between said convex and concave surfaces when the jaws are closed, resulting in spaced mating relation of the surfaces;

said stopping means being connected to said controlling means for selectively blocking movement of said piston, so that the smallest space assumable by said jaws is the gap present between the jaws in the closed position of the tool.

9. A tool according to claim 8, wherein said crimping surfaces of the jaws each have a V shape.

10. Tool according to claim 1 wherein said means for controlling the relative movement of the jaws comprise a removable one-directional ratchet system for actuating a worm housed inside a hollow clamp body, said worm carrying at one end, an end-piece interacting with the jaws at the location of a common articulation pin, for articulating said jaws toward their open or closed position, said clamp body being equipped with two bearing flats, against each of which one of the jaws bears when a main is to be clamped.

* * * * *